Patented May 31, 1927.

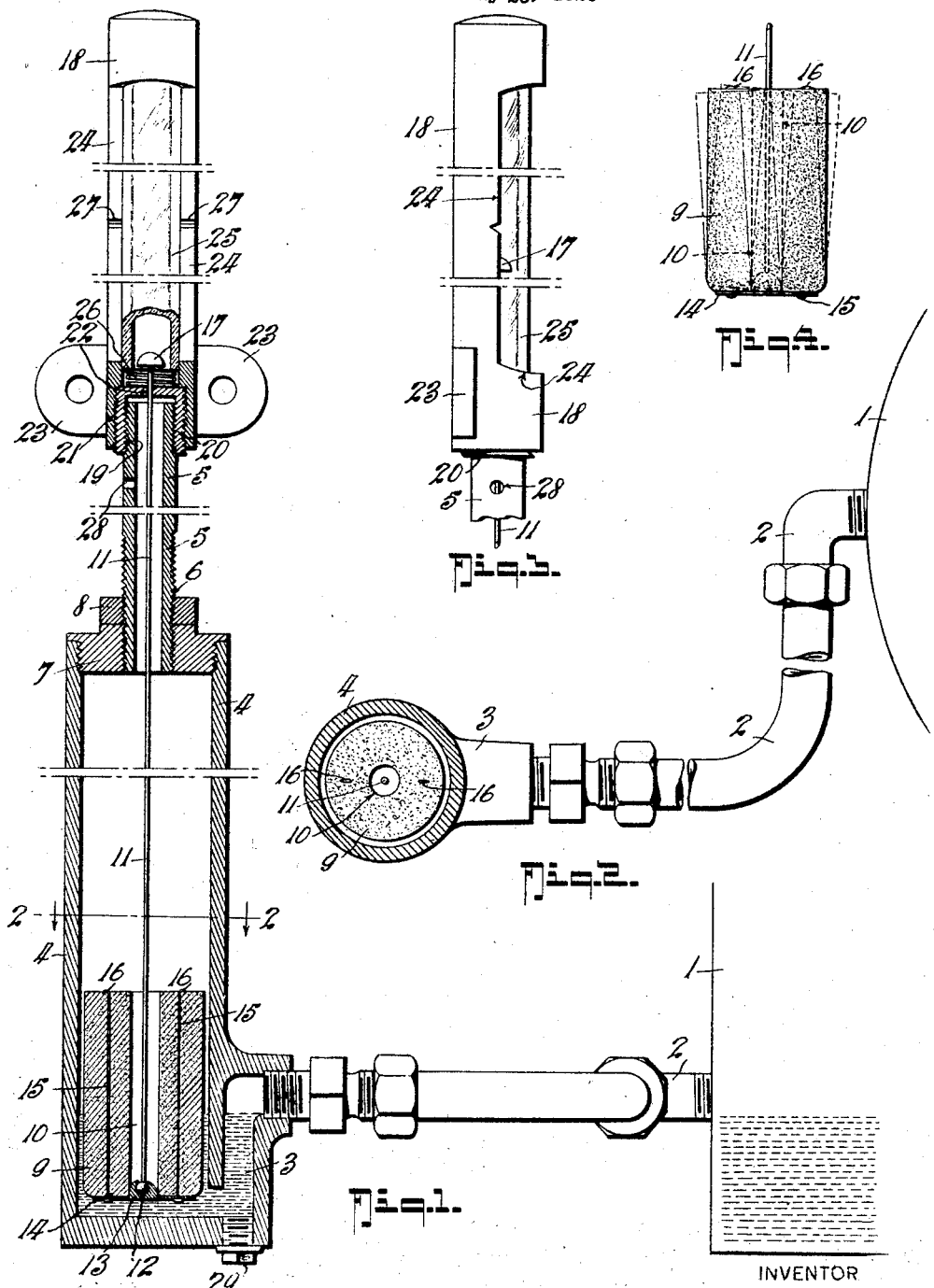

1,630,611

UNITED STATES PATENT OFFICE.

GEORGE F. FALK, OF LA CROSSE, WISCONSIN, ASSIGNOR OF ONE-HALF TO STANLEY A. TAYLOR, OF LA CROSSE, WISCONSIN.

LIQUID-LEVEL GAUGE.

Application filed May 29, 1923. Serial No. 642,281.

The invention relates to certain new and useful improvements in oil gauges of the class wherein is embodied means for positively indicating the liquid level in a tank or reservoir.

The invention has for its object to provide a device of the class stated wherein the action of indicating the liquid level is positive in its nature, due to the provision of means for insuring against binding of the float member which effects movement of the indicator used therein.

The invention further has for its object to provide an arrangement of parts such as will insure the provision at all times of a well of liquid within the chamber which accommodates the float so that proper action of the float is insured in response to the variations in the level of the liquid in the tank or reservoir with which the gauge is adapted to cooperate.

With the above and other objects in view the invention resides in the provision of those novel details of construction, combination of and arrangement of parts, all of which will be first fully described, then be particularly pointed out in the appended claims, reference being had to the accompanying drawing, in which:

Figure 1 is a central vertical section of my device operatively applied in cooperation with a tank or reservoir, parts being shown in elevation.

Figure 2 is a horizontal section taken substantially on the line 2—2 on Figure 1.

Figure 3 is a side elevation of the gauge head, the indicator head being illustrated at a position adjacent halfway the limit of its travel.

Figure 4 is a detail elevation of the float member per se, the dotted lines indicating in exaggerated degree the function of the ball and socket connection thereof with the indicator rod.

In the drawing, in which like numerals of reference indicate like parts in all of the figures, the numeral 1 is used to indicate a tank or reservoir of any particular size or shape.

In the practical development of my invention I provide suitable hollow piping 2 through which liquid from the tank or reservoir 1 is adapted to flow into the side channel or auxiliary reservoir 3 formed integral with the float chamber 4 and with the interior of which the side channel 3 is in constant communication.

The connection of the pipe 2 with the channel 3 is at a considerable distance from the bottom of the chamber casing 4, from which it will be observed that a well of liquid, such as indicated in Figure 1, will constantly be maintained within the bottom portion of the casing 4, regardless of what the level of the liquid in the tank or reservoir 1 is at the particular period.

It will be readily understood, of course, that should the liquid level in the tank 1 be raised the level of the liquid within the chamber 4 will be likewise raised and in the same degree, while on the other hand, should the liquid level within the tank 1 be diminished below the point indicated in Figure 1 the same will have no effect whatever upon the well of liquid maintained within the chamber 4 as indicated.

For a purpose soon to be described, I provide suitable connecting tubing 5 which is threaded externally at its lower end as at 6, and is adapted to be threaded into a threaded tap provided therefor through the internally threaded chamber closing plug 7. If desired this connection between the tubing 5 and the plug 7 may be made slightly adjustable as shown, and for the proper clamping of the tubing to its adjusted position, I provide the usual jamb nut 8 as shown in Figure 1.

A float member 9 is adapted to move vertically within the chamber 4 responsive to the liquid level in that chamber as controlled by the liquid level in the tank or reservoir 1. The float 9 is of cylindrical shape, the cross sectional area of which is less than that of the bore of the chamber 4 within which it is adapted to move, and the said float is provided, centrally, with a relatively large bore 10. An indicator rod 11, formed of piano wire or similar material, is utilized in carrying out the invention, which said rod is adapted to pass downwardly through the central bore 10 of the float 9 and is provided at its end with a ball 12 which is adapted to seat in a ball socket 13 formed on a plate 14, which said socket projects up into the said bore. The connector plate 14 is secured to the bottom face of the float 9 by connector pins 15 which pass through the plate and up through the float 9 and are secured thereto by clinching or otherwise, as at 16.

The indicator rod 11 passes upwardly from its connection with the float 9 through the connecting tubing 5 and is provided at its upper end with a half round indicator head 17. This head 17 may be painted black or treated in any desired way for making the same conspicuous as a marking medium.

The projected indicator head 17 is adapted to be moved vertically, through its connection with the float 9, in a gauge head 18. The gauge head is secured upon the externally threaded end 19 of the tubing 5, through the medium of an internally and externally threaded bushing 20 which threads upon the said threaded end of the tubing and in the internally threaded portion 21 of the gauge head, see Figure 1. The bushing 20 includes a closed end which is provided with a guide aperture 22 for the indicator rod 11.

The chamber 4 and the gauge head 18 are each preferably made in one piece and of aluminum smooth reamed, and the gauge head may be provided with suitable ears 23 for facilitating the mounting thereof upon the dashboard or other point of advantage where the same may be readily viewed to discern the level of the liquid in the tank or reservoir 1.

The gauge head includes a cutout portion 24 through which is visible the glass window tube 25 which is adapted to be inserted into the open end of the gauge head 18 to be secured therein by the bushing 20 there to be held to its proper position, against displacement and rattling, by a coil spring 26 which engages the same and the bushing 20, see Figure 1. The various positions of the indicator head 17 may be readily viewed through this window tube 25.

Indicator notches 27 are provided at desired points on the sides of the cutout portion 24 of the gauge head which serve to provide a means of indicating a certain liquid level within the tank or reservoir 1. In the drawing I have illustrated these notches as being positioned for indicating the halfway position but it should be readily understood that these markings may be made at any desired intervals along the range of travel of the indicator head 17 as may be desired.

An air vent 28 is provided adjacent the upper end of the tube 5 for faciltating the proper flow of liquid into the chamber 4.

A clean-out plug 29 is provided at a suitable point in the bottom of the chamber 4 through which proper cleansing of the chamber 4 and the channel 3 may be effected.

In the operation of the invention the oil or other liquid enters the channel 3 and the chamber 4 through the tubing 2 from the tank or chamber. When the level of liquid in the tank and in the chamber 4 is at the point indicated in Figure 1 the float will be positioned as is indicated in that figure. This position indicated in Figure 1 is maintained at all times when the liquid level in the tank or reservoir 1 is at the point indicated in Figure 1 or at any point below the level there indicated.

By reason of thus providing a constant well of liquid within the chamber 4 as indicated, the float 9 will be caused to rise immediately upon the rising of the liquid level in the tank 1, it being unnecessary for the liquid to first fill in around the float before exerting the lifting action.

By reason of the ball and socket connection 12—13 between the rod 11 and the float 9 and the cooperation of this connection with the relatively large central bore 10, sufficient free movement of the float upon the gauge rod 11 is permitted and, as the weight of the gauge rod is supported at the very bottom of the float 9, the float is caused to remain perpendicular at all times thus preventing its binding while moving in the chamber 4.

As the liquid level increases within the tank 1, and consequently in the chamber 4, the float 9 is caused to rise, carrying with it the indicator rod 11 and the indicator head connecting tube. By reason of the mounting of and the relative position of the gauge head 18 and the indicator head 17, the latter, as it is moved by the float 9, effectively registers or indicates through the glass window 25 of the gauge head 19, the liquid level within the tank or reservoir 1, see Figure 3.

From the foregoing description, taken in connection with the drawing, it is believed that the novel features of construction, the operation and advantages of my invention will be readily apparent to those familiar with the art to which it relates.

What I claim is:

1. A device of the class described comprising a chamber, means whereby liquid may be admitted into said chamber to correspond in level therein with the level of the liquid in the tank or reservoir from which it flows, a float having a vertical passage, said float being movable in said chamber and being adapted to respond to the variations in the liquid level in said tank or reservoir, an indicator rod passing through said passage and flexibly connected to the bottom of said float to be moved by said float for indicating the liquid level in said tank or reservoir.

2. A device of the class described comprising a chamber, means whereby liquid may be admitted into said chamber to correspond in level therein with the level of the liquid in the tank or reservoir from which it flows, a float movable in said chamber responsive to the liquid level in said tank or reservoir, an indicator rod having a ball and socket joint with said float to be moved by said float for indicating the liquid level in said tank or reservoir.

3. A device of the class described comprising a chamber, means whereby liquid may be admitted into said chamber to correspond in level therein with the level of the liquid in the tank or reservoir from which it flows, a float movable in said chamber and having a central bore, said float being adapted to respond to the variations in the liquid level in said tank or reservoir, an indicator rod passing through said central bore, a ball and socket joint connecting said rod to said float at the end of said central bore, said rod being adapted to be moved by said float for indicating the liquid level in said tank or reservoir.

GEORGE F. FALK.